UNITED STATES PATENT OFFICE.

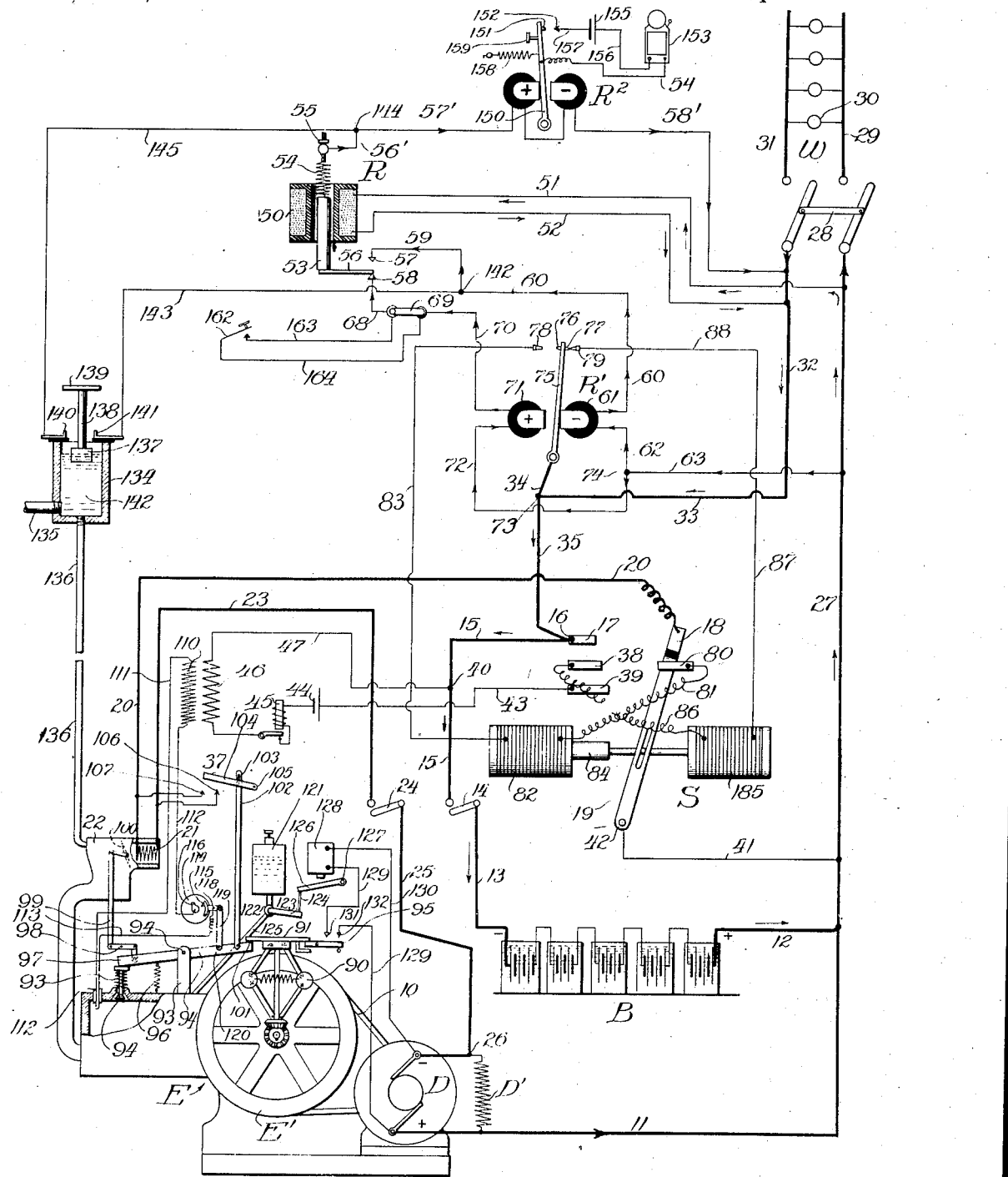

WILLIAM F. WARNER, OF DAVENPORT, IOWA.

ELECTRICAL SYSTEM OF AUTOMATIC GENERATION AND DISTRIBUTION.

1,178,195. Specification of Letters Patent. Patented Apr. 4, 1916.

Application filed December 1, 1913. Serial No. 803,892.

*To all whom it may concern:*

Be it known that I, WILLIAM F. WARNER, a citizen of the United States, residing at Davenport, in the county of Scott and State of Iowa, have invented certain new and useful Improvements in Electrical Systems of Automatic Generation and Distribution, of which the following is a specification.

My invention relates to improvements in electrical system of automatic generation and distribution.

One of the general objects of my invention is to provide a primary source of power, such as an internal combustion engine, arranged to drive and to be driven by an electrical source of energy, such as a dynamo electric machine, and a secondary source of electrical energy such as a secondary battery or accumulator, adapted to be energized by said dynamo or to energize said dynamo, as occasion may require, in association with which I provide means for automatically controlling these instrumentalities to maintain substantially constant potential upon an electric work circuit, connected therewith, under varying conditions of load.

Another, and more specific object of my invention, is the provision of a sensitive electro-responsive relay or similar device, obedient to slight variations of voltage, or differences of potential, in the work or battery circuit, the circuit closing operation of which, however, is not sufficiently stable to directly control the main switch. I therefore provide a circuit retention means, such for instance as a polarized relay, to retain the circuit conditions once established by said electro-responsive device until released thereby, as a result of a material change of voltage, and an electrically actuated switch, controlled by said electro-responsive device, through said circuit retention means, to shift suitable circuits whereby the dynamo may alternatively be operated as a motor by the batteries, to start the engine, or driven as a generator by the engine to charge the batteries.

Still another object of my invention is the provision of suitable means, controlled by said electro-responsive relay, through said circuit retention means, properly to condition the engine for operation, when driven by the dynamo as a motor and controlled by the engine when it becomes a driving element, to condition it for economical continuous operation.

Other and further objects of my invention will become readily apparent to persons skilled in the art, from a consideration of the following description when taken in conjunction with the drawing, which shows diagrammatically my automatic or semi-automatic system of electrical generation and distribution.

In the diagrammatic representation of my system E represents an internal combustion engine. B a battery, or accumulator. S a switch adapted to control suitable circuits between the battery B and the dynamo D, and R is a sensitive relay placed across the terminals of the main work or battery circuit, adapted to control a retaining device or polarized relay R', the latter having direct control of the switch S. A relay $R^2$ controls a signal bell which, under certain circumstances, becomes an alarm bell, as when the relay R fails to operate in the proper manner, or when the liquid fuel is about exhausted.

The dynamo D is properly geared with the engine E for suitable driving relation. In the exemplification shown a belt 10 exemplifies one means that may be employed for this purpose. The dynamo D is normally connected with the battery B, by the wires 11, 12, 13, switch 14, wire 15 to contact 16 connecting blade 17 to insulated contact 18, carried by the pivoted lever 19, over wire 20, through the air heating coil 21, located in the mouth of the air intake of the carbureter 22, then over the wire 23 to the switch 24 and over the wire 25 to the dynamo negative terminal 26. Thus the circuit is completed from the storage battery to the dynamo and through the heating coil 21, which is adapted to heat the ingoing air into the carbureter 22 at this time when the switch lever 19 is thrown over to make electrical connection with the relatively stationary contacts on the left hand side. At this time the battery B operates the dynamo D as a motor and the engine E is thus retated by the motor until it becomes self propelling.

When the switch lever 19, is in the position described, the circuit from the dynamo is over the wire 11 to wire 27, to the double pole switch 28, through the main 29, of the work circuit W, through the translating devices 30, to the main 31 of the work circuit; through the double pole switch 28 over the wires 32 and 33 to the point 34, thence over the wire 35 to the point 16, the switch terminal 17 and to the insulated contact 18, of the pivoted lever 19, and over the wire 20, through the short circuiting switch 37, which is then closed, and returning over the wire 23, switch 24 and the wire 25 to the negative terminal of the dynamo. The independent battery circuit is over the wire 12, to wire 27, through the main work circuit W, back to the point 16 and thence over the wire 15, through the switch 14 and the wire 13 to the negative terminal of the battery.

When the pivoted lever 19 is thrown over to the left the body portion thereof makes contact with the blades 38, and 39, thus closing the primary sparking circuit from the wire 27, which is the wire of the dynamo leading from the positive terminal, over the wire 41, to the pivotal point 42 of the lever 19, through the blade 39, over the wire 43 to a primary battery 44, through the buzzer, or vibrator 45, and through the primary coil 46, of the sparking transformer and over wire 47 to the wire 15.

The coil 50, of the relay R, is connected by wires 51 and 52 to the main work or battery circuit wires 27 and 32, respectively. The relay R is provided with an axially movable core 53, suspended by a spring 54 that is adjustable by a stem and nut 55. The core carries an extended contact arm 56, adapted to float between and make electrical connection with the relatively stationary contacts 57 or 58. The relay R is very sensitive to slight changes in the voltage, or difference of potential, of the main line circuit and when energized, normally has its contact arm 56 positioned midway between the contacts 57 and 58.

The relay R controls the retention relay R', and the latter controls the main switch 19, in a manner now about to be described. The moving portions of the relay R, are connected by contact arm 56 to wire 57 through the relay $R^2$ and by wire 58 to the main 32. Contact 57 of the relay R is connected by wire 59 to the wire 60, through the coil 61, of the relay R', by wires 62 and 63 to the wire 27. Contact 58 is connected by wire 68 through switch 69 to wire 70, through coil 71 of the polarized relay and wires 72 and 73 to point 74 and by wire 63 to the main wire 27, so that circuit may thus be closed through the coil 61 or 71, of the relay $R^2$ by the contact blade 56 of the relay R, making electrical connection with the contact 57 in the first instance or making electrical connection with the contact 58 in the second instance. The polarized relay R' is provided with a pivoted tongue or lever 75 carrying contacts 76 and 77, that coöperate with relatively stationary contacts 78 and 79, respectively.

When the blade 56, of the relay R, is in electrical connection with the contact 58, as when the voltage is abnormally low, the circuit will be completed through the wires connecting with the coil 71 of the relay R' and the tongue, or lever 75, will be drawn toward the coil 71 and connection made between the contact 76, of the pivotal lever 75, and the relative stationary contact 78. This relay being polarized the connection which it establishes, will be retained or positively preserved between these respective contacts, even the slightest touch of the blade 56 with the contact 58 will serve to draw the lever 75 over into the position described. The permanent magnet, associated with the relay R' will cause it to retain such contact, to maintain the electrical conditions it establishes thereby preserving the circuits which it controls until the coil 61, of the relay R' is energized, as a result of a material charge of voltage.

The spring 54, of the relay R, is not quite sufficient to support the core 53 and the contact blade 56, and therefore, when the circuits of the system are not energized core 53 will be depressed and the blade 56 will make electrical connection with the contact 58, and thereby close the circuit as follows: from the wire 27, over the wire 63, to the point 74, through the wire 72 and the coil 71 of the relay R', thence over wire 70, through the switch 69 and the wire 68 to the contact 58, then through the blade 56, core 53 and spring 54, to wires 56' and 57'. The circuit now passes through the coil of the relay $R^2$—for a purpose to be hereafter described,—thence through the wire 58' to the main wire 32 thus completing the circuit through the coil 71 and causing the tongue 75 of the relay R' to be drawn over to the left, effecting electrical connection between the contacts 76 and 78. This closes the circuit from the wire 27 over wire 41, pivoted arm 19, of the main switch S through the brush 80, the wire 81, through the motor magnet 82 of the main switch and over wire 83 to contact 78, thence through the lever 75 to the point 34 and over wire 33 to the wire 32 or the other terminal of the circuit. When the motor magnet 82 of the main switch S becomes thus energized the core 84 of the said magnet will be drawn inwardly thus pulling the lever 19 over to the left and causing it to make electrical connection with the relatively stationary brushes 17, 38 and 39 closing the circuits that communicate therewith and placing the motor magnet 85 in condition to be energized from the brush 38 over the wire 86, and wires 87, 88, the latter being connected to the contact 79.

When circuit is completed through the magnet 82, and the pivoted lever 19 is drawn over to the left, closing the circuits communicating with the relatively stationary blades 17, 38 and 39, circuit is thereby completed from the accumulator B over the circuits heretofore traced causing the dyamo D to operate as a motor and primarily rotating the driving shaft of the engine E, to start the engine. As soon as the engine becomes self propelling and reaches its normal speed the electro-motive force will be raised and the coil 50, of the relay R, will be energized to a greater extent, when the arm 56, of the relay R, will be lifted from connection with the contact 58, but the pivoted armature 19 of the main switch S will remain in the position in which it has been placed and connection between contacts 76 and 78 will remain closed, although the circuit, through the magnet 71 has been opened. The contact relation is positively preserved, by the polarized condition of the retaining relay R′, so that the integrity of the circuit, controlled by the contacts 76 and 78 remains unimpaired until the lever 75, of the retaining relay has been drawn over into the opposite position by relay R closing circuit through contact 57.

After the engine has charged the battery to a predetermined voltage, the core 53 of the relay R will be drawn farther into the solenoid and the arm 56 will be raised until it makes electrical connection with the contact 57, at which time the circuit will be through the magnet 61 of the retaining relay R′, causing the lever 75 to be drawn over until contacts 77 and 79 are brought into electrical connection, when the magnet 85 of the main switch will be energized and the pivoted lever 19 will be drawn over to the right until it makes connection with the switch blade 80, thus breaking the circuit of the dynamo electric machine and placing the motor magnet 82 in condition for energization when circuit is again made between the contacts 76 and 78 as heretofore described. When this occurs the translating devices 30 of the work circuit W, are supplied entirely by the energy afforded by the battery B. During the time when the battery is capable of maintaining the voltage at the desired or predetermined value, the switch arm 56 of the relay R floats between the contacts 57 and 58. After it has been operating and before it stops the engine E conditions itself for starting, and after it has been started and becomes self propelling and reaches its predetermined speed it again automatically conditions itself for continued operation so that it may automatically maintain its speed at such velocity as consistent with the requirements of the dynamo, batteries and the working circuit.

Only a very slight contact of the arm 56 with either of the associated contacts 57 or 58, of the voltage responsive relay R is necessary to sufficiently energize the coils 61 or 71 of the circuit retaining relay R′. After the arm 56 has once made circuit connection with either of the contacts 57 or 58 and the tongue 75, of the relay R′ has moved in response thereto, any subsequent breaking or making of the same circuit will not effect relay R′ because the tongue 75, having once been moved by reason of contact of the arm 56 with either of its associate contacts, it will remain in its moved position until the arm 56 makes contact with the other of its associate contacts. For this reason the operation of the electrically actuated main line switch S is rendered stable and reliable and the system practically operable.

A speed responsive governor 90 is rotated by the engine E. In the particular exemplification, the governor carries upon its upper vibrating end a plate or disk 91 which overlies a lever 92 that is pivoted to a standard 93, as at 94. It also overlies a switch lever 95. Many of the various instrumentalities for properly conditioning the engine are operated by this governor. Underlying one extended end of the lever 92 is the stem 93 of an engine relief valve 94. A spring 95 normally maintains the relief valve closed supplemented by internal pressure, but a stronger spring 96 normally maintains the outer end 97, of the lever 92, depressed so as to open the relief valve 94 when the engine is not in self propelling operation. Connected to the outer end 97, of the lever 92, is a centrally pivoted lever 98 secured to a vertically extending link 99 that controls the air throttle 100 of the carbureter 22.

Pivoted to the inner end 101, of the lever 92, is a vertical link 102, slotted as at 103, and connected to a switch arm 104 that is pivoted at 105, adapted to make connection with contacts 106 and 107 and thus short circuit the air heating resistance coil 21 that is located in the air intake mouth of the carbureter 22, after the engine has attained its normal speed.

A secondary coil 110 of the transformer is connected by wire 111 to the spark plug 112 and by wire 113 to a switch mechanism 114. This device is adapted to change the spark-time relation of the piston of the engine and the spark and consists of an oscillatable contact 115 and a rotatable contact 116, the latter being connected by wire 117 to the coil 110. The oscillatable contact 115 is connected by an arm 118 to a link 119, pivoted to the lever 92, as at 120, so that when the pivoted lever 92 is moved upon its fulcrum 94 the time relation of the spark and the stroke of the engine is thereby changed or varied. A lubricating oil receptacle 121 is provided with a stop cock 122, which has an arm 123 that is connected to a link 124. It is also provided with a pipe 125 that leads to the parts of the engine that require lubrication.

An armature 126 is pivoted, as at 127, and is responsive to the electromagnet 128. This magnet is connected across the terminals of the dynamo by wires 129 and 130 through the switch 95, which controls contacts 131 and 132. When this switch 95 is energized by closing the contacts 131 and 132, the electro-magnet 128 will attract its armature 124 and thus open the stop cock 122, permitting the oil from the reservoir 121 to pass through the pipe 125 to the parts of the engine that require lubrication. When the armature 126 of the electromagnet is retracted, as shown in the drawing, the stop cock 122 is thereby closed.

A receptacle 134 for liquid fuel is connected between the main fuel supply in the pipes 135 and 136 and the carbureter 122. This receptacle may be located at any suitable place and at any suitable height with reference to the carbureter, it being shown diagrammatically in the drawings elevated much above the engine for convenience of diagrammatic illustration. A float 137 carries a stem 138 and a metallic disk 139, the latter is adapted to make electrical connection with contacts 140 and 141 when the supply of fuel is sufficiently low in the receptacle 134 to permit of such contact connection. Contact 141 is connected to the wire 60, as at 142, by the wire 143, and contact 140 is connected to wire 57', as at 144, by wire 145, so that when the metallic cross bar, or disk 139, is in connection with the contacts 140 and 141, circuit will be closed between the points 142 and 144. This will have the same effect as closing circuit between arm 56 and contact 58.

When the parts of the engine are in the position illustrated in the diagram it is conditioned to easily and properly be started by the dynamo electric machine operating as a motor. The relief valve being open, the compression of the engine is light so that the work of the motor is reduced to a minimum; the spark time device, for igniting the charge is retarded by the position of the lever 92; the air intake, of the carbureter 22 is throttled so as to produce a comparatively rich texture for the initial charge and the coil 21 located in the mouth of the air intake of the carbureter 22 is in condition for heating the air taken into the carbureter by effect of the current employed to energize the motor, and the sparking circuit is closed by the operation of the pivoted lever 19 making connection with the blade 39 so that the engine is automatically placed in the best condition, with respect to the various controlling means, for its initial rotation in the process of starting by means of the motor.

After the engine has reached a predetermined speed, at which it becomes self operative, the governor balls of the governor 90, are extended, thereby drawing down the disk 91, supported by the movable end thereof, and depressing the inner end 101, of the lever 92, causing the seating of the relief valve 94, and the opening of the air throttle 100 of the carbureter 22; advancing the time of producing the ignition spark within the cylinder of the engine, and short circuiting the air heating coil 21, by means of the switch 104, and permitting of the opening of the valve 122 of the lubricating reservoir 121 moving the lever of the switch 95 into connection with its contacts 131 and 132, thus energizing the electromagnet 128. Thus the engine, by its own operation, is automatically placed in the very best condition for its maximum operating efficiency at the time when it is called upon to drive the load and automatically, the parts are returned to their normal positions to establish the best condition incident to the starting of the engine, by the operation of the dynamo electric machine when operating as a motor, and these operations are subject to the conditions of the battery and of the work circuit.

The relay $R^2$ is provided with a pivoted lever 150 carrying a contact 151 adapted to make connection with a relatively stationary contact 152. An alarm or signal bell 153, is connected with the pivoted arm or tongue 150 by wire 154 and to a battery 155, by wire 156. The battery is connected to the contact 152 by a wire 157. A spring 158, normally holds the tongue 150 in retracted position against the stop 159.

The operation of the relay $R^2$ is such that the bell 153, is energized and will ring during the time when the arm 156 of the relay R is in electrical connection with either contact 57 or 58. Under normal conditions the contact relation will endure for a very short period of time and therefore the bell rings for a brief period at each time a change in the circuit relations is established by the relay R, but should the arm 56 remain in electrical connection with either of the contacts 57 or 58 for a protracted period of time, the alarm bell 153 will continue to ring during that time, or should the disk 139, of the float 137, descend so low in the receptacle 134 as to cause it to close the electrical connection between contacts 140 and 141, as a result of lack of fuel in the said receptacle, as when the main supply of fuel is about exhausted, the alarm bell 153 will continue to ring independent of any condition that may prevail in the relay R. The bell 153 may be located at some point remote from the plant and within the hearing of an attendant to call attention to the fact that the fuel has become exhausted and that the plant will no longer operate normally on that account. At the same time the engine is automatically shut down or stopped.

The plant may be made semi-automatic by use of the push button 162, which may be located at a point remote from the plant, and which is connected by wires 163 and 164 to the terminals of the switch 69. When the switch 69 is open the arm 56 of the relay R may make electrical connection with the contact 58 without closing the circuit through the coil 71 of the retention relay R' and therefore the system will not be automatic for starting the plant but will be semi-automatic in that it will automatically stop the plant when the voltage of the main circuit, due to the operation of the engine has been sufficient for the arm 56 to make electrical connection with the contact 57. Under such circumstances an attendant must close the push button 62 at any time that he desires the engine to be started to replenish the battery.

During the normal operation of the engine, the speed governor may control the various instrumentalities to some extent owing to its lost motion connection with other such devices, to maintain the speed of the engine constant under load. The arrangement is such, by said lost motion connections that a limited vertical movement of the upper end of the governor is permissible so as to vary the position of the spark timing device and the fuel controlling throttle without interfering with the other instrumentalities which are automatically effected by a further motion of the governor.

It will be manifest, from a consideration of the foregoing description, that an insulated electric light plant constructed substantially in accordance with my system as illustrated, will cause the engine to automatically charge the storage batteries at intervals, determined upon the condition of the batteries themselves, and to automatically disconnect the engine and condition all the surrounding instrumentalities connected therewith for the best arrangements that are to prevail at the time when the dynamo electric machine, operating as a motor, is employed to start the engine.

While I have shown a single embodiment of the various instrumentalities and their arrangement as employed in my system for the purpose of clear disclosure it is evident that considerable changes may be made within the scope of the appended claims without departing from the spirit of my invention.

What I claim with a view and desire to secure by Letters Patent of the United States is:—

1. In a system of the character described, the combination of an internal combustion engine; a dynamo electric machine; a storage battery; suitable circuit connections including a work circuit; a sensitive controlling relay connected across said work circuit and responsive to variations of potential therein; two contacts controlled by said relay; a polarized relay, the coils of which are separately connected to the respective contacts of said sensitive relay; two contacts controlled by said polarized relay; a switch for closing the work circuit through said dynamo and electrically energizable means for moving the circuit closing member of said switch, connected to the respective contacts of said polarized relay.

2. In a system of the character described, the combination of an internal combustion engine; a dynamo electric machine; a storage battery; a work circuit; a sensitive controlling primary relay having a tongue movable between two relatively stationary contacts and responsive to variations in potential in the main work circuit; an electrically operable switch, for connecting the dynamo to the work circuit and to the battery and for disconnecting the dynamo therefrom and a secondary contact retaining relay having a tongue and two coöperating stationary contacts responsive to said primary relay, one terminal of each coil of said retaining relay connected to respective contacts of said primary relay and the contacts of said retaining relay connected to said switch to establish and retain circuit connections to energize said switch to move the switch member in either direction.

3. In a system of the character described, an internal combustion engine; a dynamo electric machine; an electric storage battery; a circuit between said battery and said dynamo; a work circuit and an ignition circuit, in combination with a switch, which when moved in one direction connects the dynamo circuit and the ignition circuit with the work circuit; an electromagnet for so moving said switch to effect said connections; an electromagnet for moving said switch in the opposite direction to open said circuits, a relay for controlling both magnets alternatively whereby to connect said dyamo circuit and said ignition circuit to said work circuit and to disconnect them therefrom, and another relay responsive to variations of potential of the work circuit for energizing the first mentioned relay.

4. In a system of the character described, an internal combustion engine; a dynamo electric machine; an electric storage battery; an engine ignition means; a work circuit; circuit connections between said devices, in combination with a primary relay responsive to changes of potential in said work circuit; a circuit retaining device controlled by said relay; an automatic switch to alternatively connect and disconnect the dynamo to and from the battery and work circuit, and to close and open the ignition circuit and current responsive means for moving an appropriate member of the switch, controlled by said circuit retaining device.

5. In a system of the character described, the combination of an internal combustion engine; a dynamo electric machine; a storage battery; a work circuit to which the said battery and said dynamo are adapted to be connected; a sensitive controlling primary relay responsive to variations of potential in said work circuit; a main electrically actuated switch, for connecting the dynamo and battery and for disconnecting them; a secondary, contact-retaining polarized relay, responsive to said primary relay to establish and retain circuit connections to deënergize said switch actuating means, to stop the engine, and manually operable means located at a remote point, to energize said switch actuating means to start the engine.

6. In a system of the character described, the combination with an internal combustion engine; a dynamo electric machine; a storage battery; a work circuit, to which said dynamo and battery are adapted to be connected; a sensitive controlling primary relay responsive to variations of potential in said main work circuit; a main electrically actuated switch, for connecting the dynamo and battery and for disconnecting them, and a secondary, contact-retaining polarized relay, responsive to said primary relay to establish electric connections to deenergize said switch actuating means to stop the engine; manually operable means located at a remote point to energize said switch actuating means to start the engine; an alarm bell located near said operable means, and means connected with said circuit to energize said bell by the current impulse established when the switch is energized.

7. In a system of the character described, the combination of an internal combustion engine; a dynamo electric machine; a storage battery; a work circuit to which said dynamo and battery are adapted to be connected; a sensitive, controlling primary relay, responsive to variations of potential in the main circuit; a main electrically actuated switch, for connecting the dynamo and battery and for disconnecting them; a secondary contact-retaining polarized relay, responsive to said primary relay to establish and retain circuit connections to energize said switch actuating means to stop and to start said engine, and an alarm bell located at a remote point, operable coincident with said switch to sound an alarm.

In testimony whereof I hereunto set my hand in the presence of two witnesses.

WILLIAM F. WARNER.

In the presence of—
C. SHULER,
F. B. YETTE.